US011741829B2

(12) United States Patent
Bararsani et al.

(10) Patent No.: US 11,741,829 B2
(45) **Date of Patent: *Aug. 29, 2023**

(54) METHOD OF PROVIDING TRAFFIC RELATED INFORMATION AND DEVICE, COMPUTER PROGRAM AND COMPUTER PROGRAM PRODUCT

(71) Applicant: Telefonaktiebolaget LM Ericsson (publ), Stockholm (SE)

(72) Inventors: Azadeh Bararsani, Solna (SE); Marcus Gårdman, Skärholmen (SE); Cristian Norlin, Stockholm (SE); Gábor Stikkel, Sollentuna (SE); Anna Viggedal, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 176 days.

This patent is subject to a terminal disclaimer.

(21) Appl. No.: 17/320,300

(22) Filed: May 14, 2021

(65) Prior Publication Data

US 2021/0272450 A1 Sep. 2, 2021

Related U.S. Application Data

(63) Continuation of application No. 15/773,081, filed as application No. PCT/EP2015/075661 on Nov. 4, 2015, now Pat. No. 11,024,158.

(51) Int. Cl.

| | |
|---|---|
| ***G08G 1/01*** | (2006.01) |
| ***G08G 1/16*** | (2006.01) |
| ***B61L 15/00*** | (2006.01) |
| ***G05D 1/02*** | (2020.01) |

(Continued)

(52) U.S. Cl.
CPC ........... *G08G 1/0112* (2013.01); *G08G 1/012* (2013.01); *G08G 1/0116* (2013.01);
(Continued)

(58) Field of Classification Search
CPC ........ G08G 1/01; G08G 1/137; G08G 1/0967; G08G 1/09; G08G 1/16; G08G 1/00;
(Continued)

(56) References Cited

U.S. PATENT DOCUMENTS 9,754,325 B1 * 9/2017 Konrardy ........... G06K 9/00845
11,024,158 B2 * 6/2021 Bararsani ......... G08G 1/096775
(Continued)

FOREIGN PATENT DOCUMENTS

DE 10 2012 102 693 10/2013
DE 102012102693 A1 * 10/2013 ........... G08G 1/0141

OTHER PUBLICATIONS

International Search Report and Written Opinion issued in International Application No. PCT/EP2015/075661, dated Jul. 22, 2016, 13 pages.

*Primary Examiner* — Yuri Kan
(74) *Attorney, Agent, or Firm* — Rothwell, Figg, Ernst & Manbeck, P.C.

(57) ABSTRACT

A method of providing traffic related information is provided. The method is performed in a device and comprises obtaining data relating to a first vehicle and data relating to a second vehicle, establishing a relative position between the first vehicle and the second vehicle based on the obtained data, and providing, to an entity in the first vehicle, information based on the established relative position. A corresponding device, computer program and computer program product are also provided.

20 Claims, 4 Drawing Sheets

(51) Int. Cl.
*G08G 1/04* (2006.01)
*G08G 1/0967* (2006.01)

(52) U.S. Cl.
CPC ......... *G08G 1/0129* (2013.01); *G08G 1/0133* (2013.01); *G08G 1/0141* (2013.01); *G08G 1/04* (2013.01); *G08G 1/096716* (2013.01); *G08G 1/096741* (2013.01); *G08G 1/096775* (2013.01)

(58) Field of Classification Search
CPC .. G08G 1/04; G08G 1/096775; G08G 1/0116; G01C 21/34; H04W 4/02; G06Q 40/08; B60W 30/18; B60W 30/09; G01S 19/51; G01S 5/02; G05D 1/02; B61L 15/00
See application file for complete search history.

(56) References Cited

U.S. PATENT DOCUMENTS

2011/0164562 A1* 7/2011 Qiu .................. H04W 72/1236 370/328
2013/0030687 A1* 1/2013 Shida ........................ G01S 7/41 701/301
2013/0041574 A1* 2/2013 Koshizen ............. G08G 1/0112 701/118
2013/0261947 A1* 10/2013 Yamashiro ............. G08G 1/137 701/300
2014/0018995 A1* 1/2014 Ferguson ............. G05D 1/0289 701/25
2014/0197967 A1* 7/2014 Modica ................ G08G 1/0133 340/932
2015/0134156 A1* 5/2015 Henry ...................... G07C 5/00 701/19
2015/0353094 A1* 12/2015 Harda ............. B60W 30/18163 701/23
2016/0046288 A1* 2/2016 Pawlicki ................... B60T 7/22 701/41
2016/0091612 A1* 3/2016 Heo ...................... G01S 13/931 701/468
2016/0148514 A1* 5/2016 Iwami ................... B60W 30/06 340/932.2
2016/0284218 A1* 9/2016 Ejiri ....................... G08G 1/166
2017/0108576 A1* 4/2017 Xu .......................... H04W 4/02

* cited by examiner

METHOD OF PROVIDING TRAFFIC RELATED INFORMATION AND DEVICE, COMPUTER PROGRAM AND COMPUTER PROGRAM PRODUCT

CROSS-REFERENCE TO RELATED APPLICATION

This application is a continuation of U.S. application Ser. No. 15/773,081, filed on May 2, 2018 (status pending) (published as U.S. Patent Publication No. 2018/0322776 on Nov. 8, 2018), which is a 35 U.S.C. § 371 National Stage of International Patent Application No. PCT/EP2015/075661, filed Nov. 4, 2015, designating the United States. The above identified applications and publication are incorporated by this reference herein in their entirety.

TECHNICAL FIELD

The technology disclosed herein relates generally to provision of information, and in particular to a method of providing traffic related information and corresponding device, computer program and computer program product.

BACKGROUND

Traffic monitoring by means of cameras may be used in order to obtain knowledge about traffic situation, e.g. for informing about current traffic congestions and in an effort to avoid accidents by informing road-users about e.g. obstacles. From a traffic authority perspective it is highly interesting to monitor traffic in real time, but also to continuously analyze the information in order to better assess e.g. traffic flow and accidents. The more information that is available and the more accurate this information is, the better e.g. traffic information and traffic predictions can be made.

SUMMARY

An objective of the present teachings is to provide a way of obtaining information, which also has a higher accuracy, and in particular information on relative positions between vehicles.

The objective is according to an aspect achieved by a method of providing traffic related information. The method is performed in a device and comprises obtaining data relating to a first vehicle and data relating to a second vehicle; establishing a relative position between the first vehicle and the second vehicle based on the obtained data; and providing, to an entity in the first vehicle, information based on the established relative position.

The method enables and provides an increased security in the traffic by providing information to a vehicle about or relating to other vehicles in the vicinity. Accidents may be avoided by informing a driver of a vehicle about, for instance, a possibly dangerous overtaking by another vehicle, or by alerting the driver about another vehicle having an erratic driving behavior.

In an embodiment of the method the data relating to the first vehicle comprises data about distance to the second vehicle as determined in the first vehicle by means of a sensor arranged in the first vehicle. By having the first vehicle measure and report its distance to vehicles in its vicinity highly accurate data on the relative positions between vehicles on the road is obtained. Such knowledge can, for instance, be used to predict traffic, to avoid accidents and to improve traffic flow.

The objective is according to an aspect achieved by a computer program for a device for providing traffic related information. The computer program comprises computer program code, which, when executed on at least one processor on the device causes the device to perform the method as above.

The objective is according to an aspect achieved by a computer program product comprising a computer program as above and a computer readable means on which the computer program is stored.

The objective is according to an aspect achieved by a device for providing traffic related information. The device is configured to obtain data relating to a first vehicle and data relating to a second vehicle; establish a relative position between the first vehicle and the second vehicle based on the obtained data; and provide, to an entity in the first vehicle, information based on the established relative position.

Further features and advantages of the embodiments according to the present teachings will become clear upon reading the following description and the accompanying drawings.

DETAILED DESCRIPTION

Figure 1:
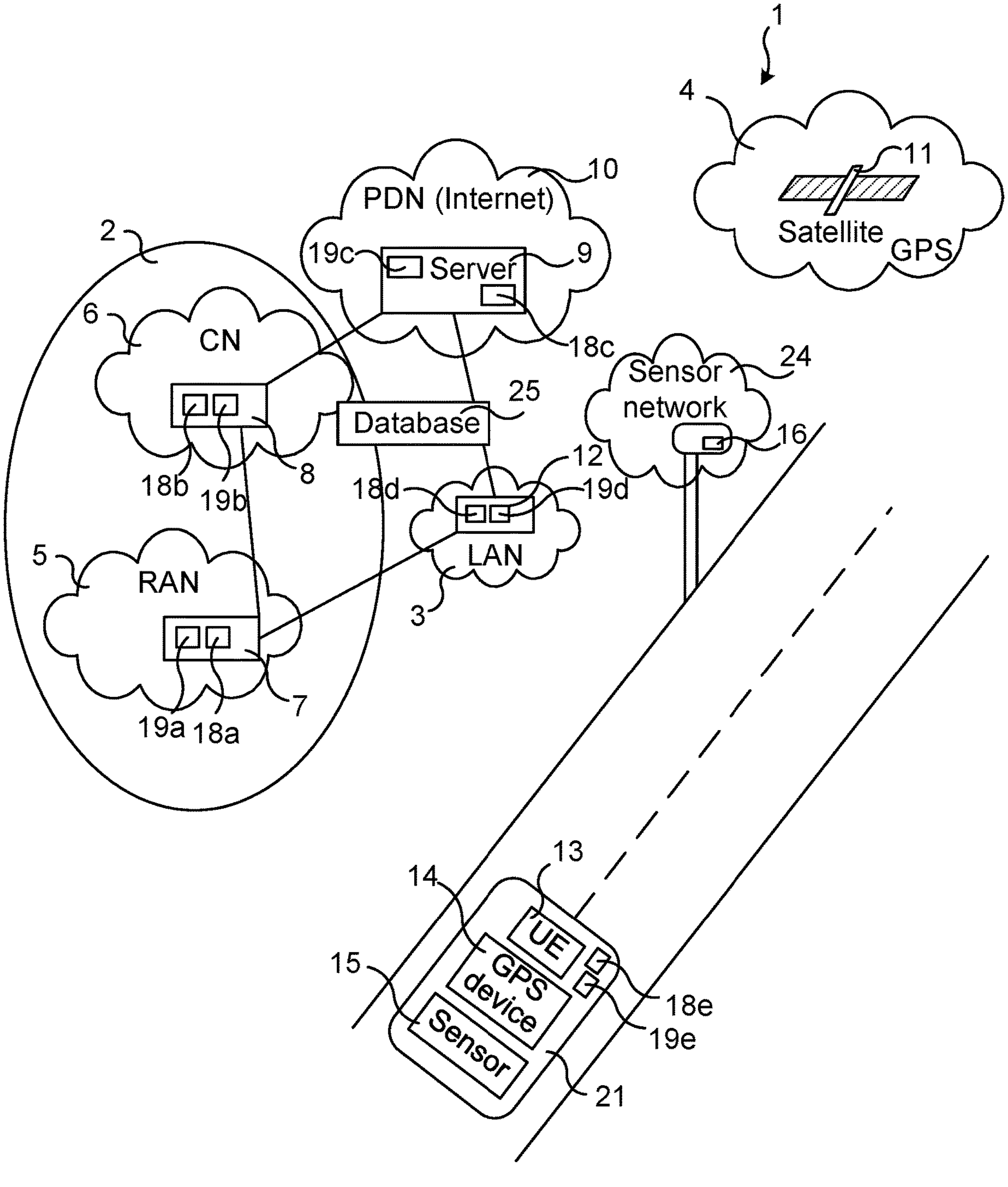
FIG. 1 illustrates schematically an environment in which embodiments according to the present teachings may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

There are several ways of tracking an object's position on earth, i.e. its geographical position. The most widely known system is Global Positioning System (GPS) while another way is to make use of radio communications systems, e.g. performing a network-based triangulation with the aid of e.g. base stations. A few shortcomings of these existing solutions are that the level of detail of the obtained position is low and that the error of margin can vary quite a lot thus rendering the information unreliable. The present teachings address these shortcomings by providing methods, devices, system and means for obtaining more accurate position information.

Briefly, the present teachings provide improvements relating to traffic information, in particular by providing information on the relative positions of vehicles. The present teachings address the need for more information, and more accurate information, by providing a way of utilizing sensors on/in tracked vehicles and/or in their environment. Such sensor information may be used alone or together with known positioning systems, e.g. GPS and/or other conventional positioning techniques, e.g. using mobile radio networks in various ways, such as the above mentioned triangulation.

This may, in some embodiments, be implemented in a telecommunication assisted cloud-based solution for traffic information. In an aspect, several objects' positions, in particular vehicles' positions, in relation to each other are identified. For instance, the relative positions of vehicles driving in parallel lanes on a highway may be provided and used e.g. for traffic prediction and for informing or warning drivers.

In an aspect thus, the present teachings provide a cloud-based solution making use of e.g. conventional GPS positioning data, mobile network positioning data and also data from vehicles on the road about their relative positions. This enables patterns about individual vehicles' movements to be analyzed in great detail. In view of the increasing interest in autonomous vehicles, such information is also highly interesting in order to provide more accurate driving instructions, e.g. about directions and preferred behavior in different situations.

Many vehicles are currently equipped with a GPS, and many drivers bring a communication device (e.g. a mobile phone) with them in the vehicle. Further, it may be foreseen that various types of sensors will be provided in the future, e.g. sensors along roads, e.g. in lamp posts, sensing various parameters of the surrounding. Such sensors could, for instance, be arranged to collect real-time data about traffic-flows, vehicle speeds etc. The present teachings may take advantage of such sensors but also of sensors on the vehicles. In particular, vehicles may be equipped with sensors, which may, in different embodiments, be used in order to obtain information about the vehicle as well as about its surroundings.

Internet of things, wherein different types of devices communicate over Internet, is believed to be an important type of infrastructure in the future. In different embodiments, a method may be performed in a distributed manner involving Internet of things.

FIG. 1 illustrates an environment in which different embodiment of the present teachings may be implemented. Different types of systems may be taken advantage of in collecting and processing information; a wireless network 2 comprising a radio access network (RAN) 5 and core network (CN) 6, a local area network (LAN) 3 for instance receiving data from different sensors 15, 16, a positioning system 4, such as e.g. GPS utilizing satellites 11, a packet data network (PDN) 10, e.g. Internet. It is noted that still other systems, not illustrated, may also be taken advantage of in collecting information. Further, information may be provided by users, e.g. the driver of a vehicle may manually input and convey some information that he finds to be important. Examples of sensors comprise sensors of a sensor network 24, e.g. comprising a number of sensors 16 arranged in lamp posts, or sensors 15 arranged in vehicles 21.

Each vehicle 21, e.g. car, bus, truck etc., may comprise a number of devices which may be used in the information collecting: a GPS receiver 14, a communication device 13 (also denoted user equipment, UE) and the above mentioned sensors 15 arranged in the vehicles 21. The sensors may comprise sensors sensing if there is any obstacle within a certain distance, speed meters, radars etc. Each vehicle 21 may send information obtained from these devices 13, 14, 15 to an infrastructure, e.g. over the wireless network 2 to an application 19*c* running on a server 9 of Internet or a device 18*c* (e.g. processor) of the server 9 or to an application 19*a* or device 18*a* in e.g. a radio access node 7 of the RAN 5 or to an application 19*b* or device 18*b* in e.g. a node 8 of the core network 6 or to an application 19*d* or device 18*d* in the LAN 3. In still other embodiments, the vehicle 21 may send the information obtained from the various devices 13, 14, 15 arranged in or on the vehicle 21 to a device 18*e* or an application 19*e* that is provided in the vehicle. Such information may also be sent to vehicles in the vicinity of the information collecting vehicle, e.g. over a near-field communication technology.

The system 1 may also comprise various memory devices, e.g. databases, for storing vehicle related information. The information may be used for providing predictions based on historical data and/or current data. Such memory device may be located anywhere in the system 1, and is indicated at reference numeral 25.

The information may comprise an identity (ID) of the vehicle, location of the vehicle, speed and whether there is another vehicle or any obstacle on any side of the vehicle 21. The vehicle 21 may send the information continuously or regularly at configured intervals or on request.

The information, e.g. GPS data, sensors data and information about roads may be processed in different ways and immediately be provided as feedback to the vehicle(s). For instance, a hazardous situation may be when a first car is trying to overtake a second car that has already started to overtake a third car. Information about such vehicles that are close by may then immediately be provided as feedback e.g. to the first vehicle which may abort the overtaking. The available information may be combined and processed in different ways for assessing a dangerous situation. Data analysis and machine learning algorithms may for instance be used, involving e.g. advanced pattern recognition algorithms and/or simulation and a recommender system comprising recommendation capabilities may be used. It is noted that this may be implemented in a distributed manner, locally and/or in a centralized component (e.g. in a so called cloud environment).

Another example is that although a certain vehicle, e.g. a car, is following the speed limit on a given road, it may be better to slow down in view of information on weather conditions on the road, e.g. rain making the road slippery. Sensors 16 of the sensor network 24 may provide such information to e.g. the application 19*d* or device 18*d* in the LAN 3, which in turn may provide them to an application 19*c* or device 18*c* on the server 9 of the PDN 10. The application 19*c* or device 18*c* may receive or obtain other information as well, e.g. historical data showing an increased risk associated with driving at certain speeds on that particular road when raining. All such information may be processed and information be sent to the vehicle, e.g. suggestion to slow down even though the speed limit is indeed followed. As a particular example, the historical data may reveal a high number of traffic accidents and/or incidents at a particular road segment during a particular time of day (e.g. at sun rise) and a warning may then be issued to drivers driving there at the particular time of day.

Figure 2:
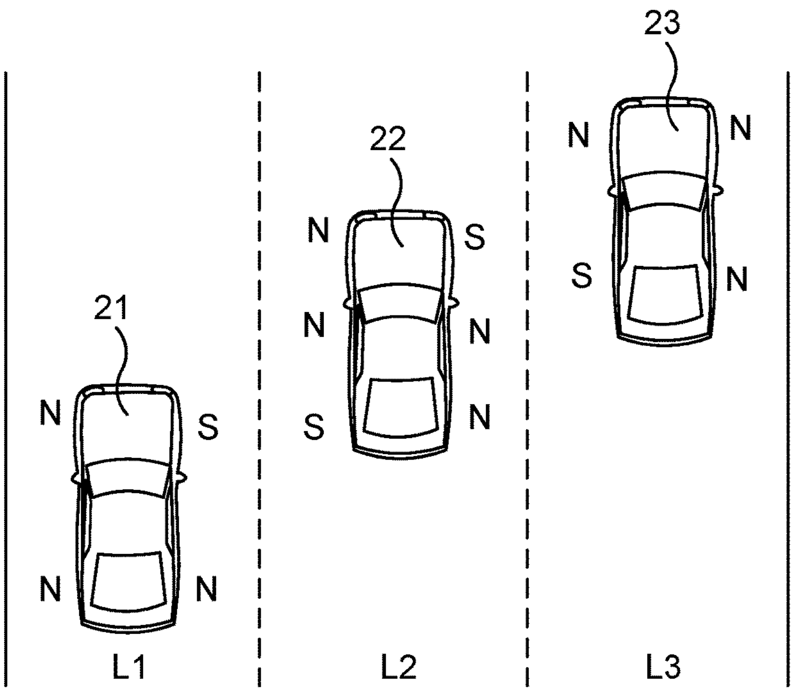
FIG. 2 illustrates a scenario in which embodiments according to the present teachings may be useful.

FIG. 2 illustrates such a scenario in which embodiments according to the present teachings may be useful. Three vehicles 21, 22, 23 are driving on a respective lane L1, L2, L3. The first, second and third vehicles 21, 22, 23 are each provided with sensors sensing if there is another vehicle (or other "obstacle") in the vicinity. In the FIG. 2, "N" denotes a sensor currently not sensing anything in the vicinity (i.e. Nothing being close enough to be sensed) and "S" denotes a sensor currently sensing Something being close enough to be sensed. A sensor of the first vehicle 21 senses that there is another vehicle, namely the second vehicle 22, to the right. The first vehicle 21 may send this information together with e.g. GPS data on its actual geographical position to, for instance, an application 19*c* or device 18*c* on the server 9. Likewise, the second vehicle 22 sensing an object on its right as well as left side sends this information to the application 19*c* or device 18*c*. Finally, also the third vehicle 23, sensing an object on its left side, sends information to the application 19*c* or device 18*c*. The application 19*c* or device 18*c* receiving all the sensor information and also e.g. GPS data on their respective geographical positions may then establish the relative positions of the vehicles and provide them with relevant information. For instance, information can be sent informing the first vehicle 21 that an abortion of the overtaking of the second vehicle 22 might be a safer option.

In other embodiments, each vehicle may receive sensor data from the vehicles nearby, e.g. using near-field communication means, and be provided with an application 19*e* or device 18*e* for calculating the relative positions. In still other embodiments, the calculations can, as indicated earlier, be performed by an application 19*d*, 19*a*, 19*b* or device 18*d*, 18*a*, 18*b* of the LAN 3, the RAN 5 and core network 6, respectively. In yet other embodiments, two or more applications or devices are involved in performing the described methods, e.g. an application performing processing such as calculations, a device conveying information to and from such application.

Another use case comprises assessing road signage issues, e.g. discovering and thus enabling rectifying of unclear signage. As a particular example, a road segment wherein cars seem to make unexpected lane changes may be due to lack of visibility of road signs warning about e.g. an upcoming driveway. Still another example wherein the described information retrieval may be valuable comprises in obtaining, based on the retrieved information, hints on road quality, e.g. pot holes leading to sudden changes of lane. The information on the relative positions between the vehicles facilitates making e.g. conclusions about existence of a pothole and may give a more accurate position thereof.

Another use case relates to the development of self-driving cars and other related technical advancements, such as platooning of cars/trucks on highways for instance. A traffic cloud solution in various embodiments suggested herein, may add great value to such technologies by continuously gather the exemplified data (sensor data, GPS data, mobile network positioning data etc.), analyze it, and then communicate the outcome to the relevant platforms, for instance, providing self driving cars or platooning solutions with a better understanding of their surroundings.

As mentioned earlier, the vehicle related data may be stored in e.g. a database 25. Such historical data may then be used for predicting traffic flows, traffic congestions, shortcomings related to road signage, road quality, visibility issues etc.

Figure 3:
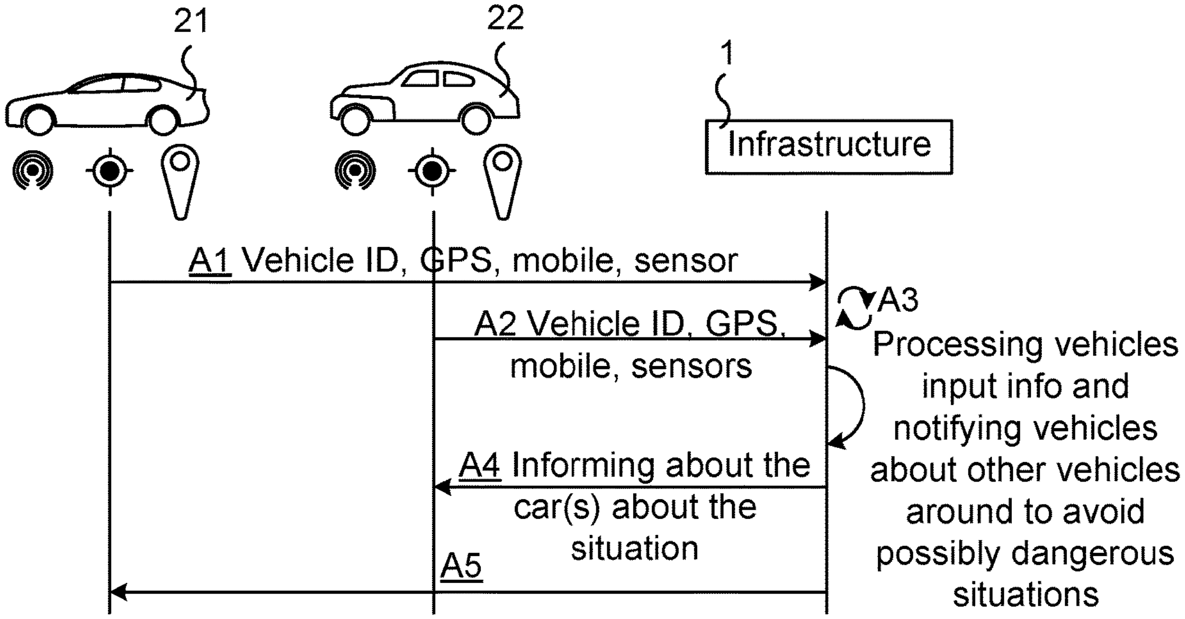
FIG. 3 is a signaling diagram illustrating aspects of the present teachings.

FIG. 3 is a signaling diagram illustrating aspects of the present teachings. At arrows A1 and A2 the first and second vehicles 21, 22 send information to an application, device or node of the system 1 (denoted "infrastructure" in the figure). The information may for instance, as indicated in the figure, comprise vehicle ID, GPS data, mobile communication data, vehicle sensors (sensors arranged at different locations around the vehicle) or other information such as relative speed between the vehicles. At A3, one or more applications and/or devices process the information that has been received. This processing may for instance, as has been described, comprise determining whether there is a potentially hazardous situation and providing suggested course of action A4, A5, e.g. reducing speed, avoiding an overtaking etc.

The various features and embodiments that have been described may be combined in different ways, examples of which are given in the following, with reference first to FIG. 4.

Figure 4:
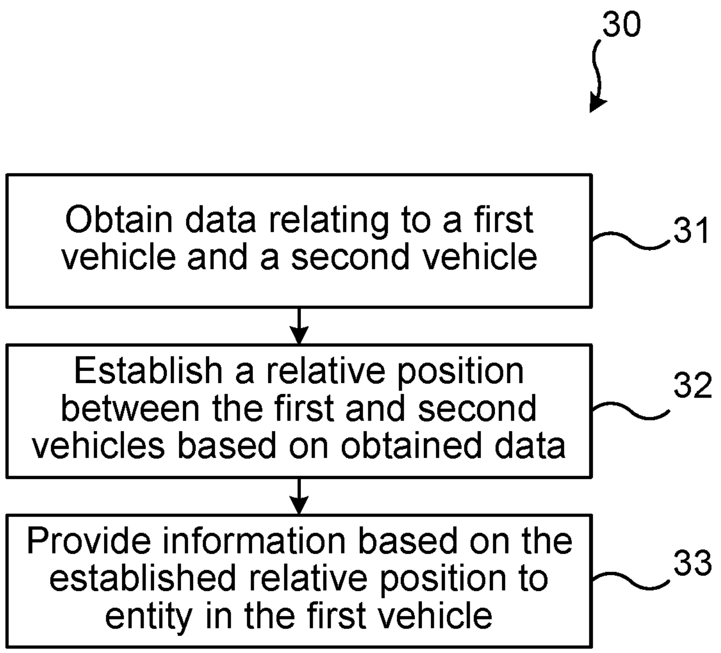
FIG. 4 illustrates a flow chart over steps of an embodiment of a method in a device in accordance with the present teachings.

FIG. 4 illustrates a flow chart over steps of an embodiment of a method in a device in accordance with the present teachings. The method 30 of providing traffic related information may be performed in a device 18*a*, 18*b*, 18*c*, 18*d*, 18*e*. The method 30 comprises obtaining 31 data relating to a first vehicle 21 and data relating to a second vehicle 22. The data may for instance comprise vehicle identification and any sensor information informing about other vehicles being nearby and also a geographical position obtained e.g. by means of a GPS device 14.

The method 30 comprises establishing 32 a relative position between the first vehicle 21 and the second vehicle 22 based on the obtained data. Having for instance the information on geographical position and the sensor data from two vehicles a relative position between them may be determined.

The method 30 comprises providing 33, to an entity 13, 14, 19*e* in the first vehicle 21, information based on the established relative position. Such information may for instance be a warning about hazardous situations, speed suggestions, warnings etc. Even physical intervention/prevention is conceivable for instance if the driver intends to take a clearly non-advisable action, such as attempting to overtake a vehicle in a hazardous situation. To this end, the first vehicle 21 may be provided with control means for the vehicle to perform autonomously some such intervening/preventing actions. As another example, if a vehicle tries to overtake another vehicle where there is a (sharp) turn on the road, the prevention action is to avoid (/prevent) overtaking, since considering the location of the vehicles, there is a high risk of an accident occurring.

It is noted that the method 30 may be performed in a system as well. The different steps may be performed in a distributed manner, wherein devices are configured to collaborate. For instance, one or more steps may be performed by a first device and other steps by other devices. As a particular example, an implementation may be that a device of the first vehicle gathers information from sensors of the vehicle, sends this information to another device, e.g. a server on the Internet ("cloud") which is running an application processing the information, e.g. establishing the relative position between the first vehicle 21 and the second vehicle 22, from which the application also has received information. The processed information may then be provided to the entity of the first vehicle over a LAN 3 or a wireless network 2.

In various embodiments, the obtaining 31 data relating to the first vehicle 21 comprises receiving or requesting the data from the first vehicle 21 via one or more of: a cellular network 2, a local area network 3, a positioning system 4, a packet data network 10 and a sensor network 24.

In various embodiments, the establishing 32 the relative position between the first vehicle 21 and the second vehicle 22 comprises calculating, in the device 18*a*, 18*b*, 18*c*, 18*d*, 18*e*, the relative position based on the obtained data, or receiving, from a second device 19*a*, 19*b*, 19*c*, 19*d*, 19*e*, the relative position as calculated by the second device 19*a*, 19*b*, 19*c*, 19*d*, 19*e*.

In various embodiments, the providing 33, to the entity 13, 14, 19*e* in the first vehicle 21, information based on the established relative position comprises conveying the information via one or more of: a cellular network 2, a local area network 3, a positioning system 4 and a packet data network 10.

In various embodiments, the method 30 comprises:

storing, in a memory device 25, 45, data comprising one or more of: the data relating to the first and second vehicles 21, 22, the relative position between the first vehicle 21 and the second vehicle 22, the information based on the established relative position, data obtained from sensors 16, 15, data obtained from a positioning system 4, and establishing based on the stored data one or more of: traffic flow prediction, traffic congestion prediction, road signage issues, road quality and visibility issues.

In various embodiments the method 30 comprises:

obtaining one or more of: the data relating to the first and second vehicles 21, 22, the relative position between the first vehicle 21 and the second vehicle 22, the information based on the established relative position, data obtained from sensors 16, 15, data obtained from a positioning system 4, and establishing, based on one more of the obtained data, current traffic situation.

In variations of the above embodiments, the method 30 comprises providing the established information at least to the entity 13, 14, 19*e* in the first vehicle 21. The information may be provided to various other entities as well, e.g. other vehicles or traffic surveillance centers etc.

In various embodiments, the data relating to the first vehicle 21 and the data relating to the second vehicle 22 comprises one or more of: identification of the first vehicle 21, speed of the first vehicle 21, geographical position of the first vehicle 21, sensor information captured in the first vehicle 21, identification of the second vehicle 22, speed of the second vehicle 22, geographical position of the second vehicle 22, sensor information captured in the second vehicle 22.

In various embodiments the method 30 comprises providing, to a device in the second vehicle 22, information based on the established relative position. The device may for instance be a device 18 in the first vehicle 21, and it may be arranged to communicate the information to the second vehicle 22 in a near field communication.

In various embodiments, the data relating to the first vehicle 21 comprises data on distance to the second vehicle 22 as determined in the first vehicle 21 by means of a sensor 15 arranged in the first vehicle 21.

In a variation of the above embodiment, the data on distance comprises distance between a first point of the first vehicle 21 and a second point of the second vehicle 22. Highly accurate information may thereby be provided.

In various embodiments, the information based on the established relative position comprises one or more of: warning about a hazardous situation, advice on overtaking the second vehicle 22, warning about an ongoing overtaking made by the second vehicle 22.

It is noted that the method 30 may be performed in a system as well. The different steps may be performed in a distributed manner, wherein devices are configured to collaborate. For instance, one or more steps may be performed by a first device and other steps by other devices. As a particular example, an implementation that may be envisioned is that a device of the first vehicle gathers information from sensors of the vehicle, sends this information to another device, e.g. a server on the Internet ("cloud") which is running an application processing the information, e.g. establishing the relative position between the first vehicle 21 and the second vehicle 22. The processed information may then be provided to the entity of the first vehicle.

Figure 7:
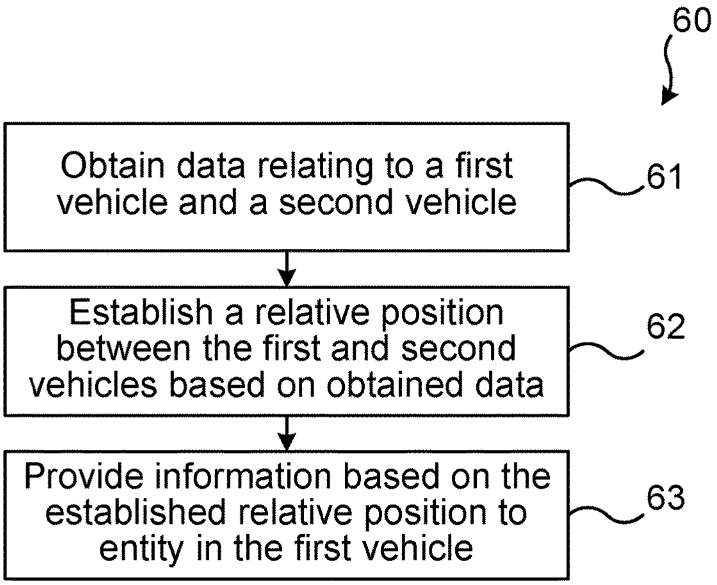
FIG. 7 illustrates a flow chart over steps of an embodiment of a method in a system in accordance with the present teachings.

FIG. 7 illustrates a flow chart over steps of an embodiment of a method in a system in accordance with the present teachings. The present teachings also provide a method 60 in a system 1 and a system for providing traffic related information. Such method 60 comprises:

obtaining 61 data relating to a first vehicle 21 and data relating to a second vehicle 22, establishing 62 a relative position between the first vehicle 21 and the second vehicle 22 based on the obtained data, and providing 63, to an entity 13, 14, 19*e* in the first vehicle 21, information based on the established relative position.

The various embodiments of the method may, as mentioned and described above, be performed in a distributed manner in the system 1.

Figure 5:
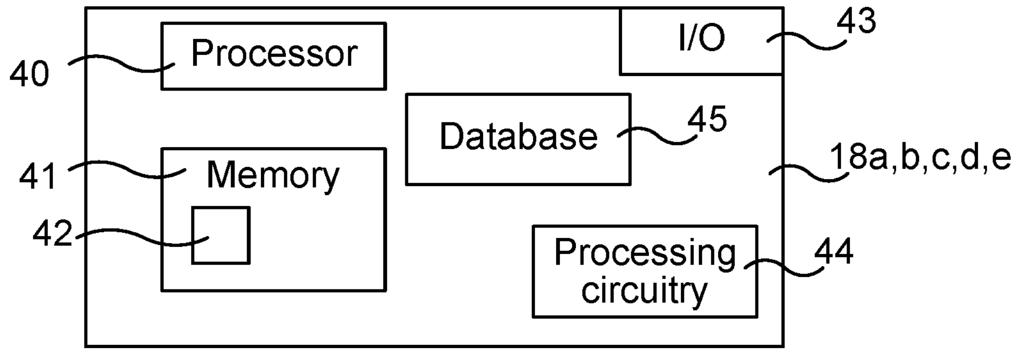
FIG. 5 illustrates schematically a device and means for implementing embodiments in accordance with the present teachings.

FIG. 5 illustrates schematically a device and means for implementing embodiments in accordance with the present teachings.

The device 18*a*, 18*b*, 18*c*, 18*d*, 18*e* comprises a processor 40 comprising any combination of one or more of a central processing unit (CPU), multiprocessor, microcontroller, digital signal processor (DSP), application specific integrated circuit etc. capable of executing software instructions stored in a memory 41 which can thus be a computer program product 41. The processor 40 can be configured to execute any of the various embodiments of the method for instance as described in relation to FIG. 4.

The memory 41 can be any combination of read and write memory (RAM) and read only memory (ROM), Flash memory, magnetic tape, Compact Disc (CD)-ROM, digital versatile disc (DVD), Blu-ray disc etc. The memory 41 may also comprise persistent storage, which, for example, can be any single one or combination of magnetic memory, optical memory, solid state memory or even remotely mounted memory.

The device 18*a*, 18*b*, 18*c*, 18*d*, 18*e* may comprises an input/output device 43 (indicated by I/O in FIG. 5) for communicating with devices, entities, applications, nodes etc. The input/output device 43 may comprise means, e.g. transmitter circuitry, receiver circuitry, interfaces, protocol stacks etc. Such interface 43 may comprise a wireless communication interface (e.g. radio interface) and/or wired communication interface.

The device 18*a*, 18*b*, 18*c*, 18*d*, 18*e* may comprise additional processing circuitry, schematically indicated at reference numeral 44, for implementing the various embodiments according to the present teachings.

The device 18*a*, 18*b*, 18*c*, 18*d*, 18*e* may comprise or be able to access a memory device 45, e.g. a database, for storing vehicle related data. The memory device 45 may be used for obtaining historical data and making predictions based thereon.

The present teachings also encompasses a computer program 42 for a device 18*a*, 18*b*, 18*c*, 18*d*, 18*e* for providing traffic related information. The computer program 42 comprises computer program code, which, when executed on at least one processor on the device 18*a*, 18*b*, 18*c*, 18*d* causes the device 18*a*, 18*b*, 18*c*, 18*d*, 18*e* to perform the method 30 according to any of the described embodiments thereof.

The present disclosure also encompasses computer program products 41 comprising a computer program 42 for implementing the embodiments of the method as described, and a computer readable means on which the computer program 42 is stored. The computer program product 41 may, as indicated earlier, be any combination of random access memory (RAM) or read only memory (ROM), Flash memory, magnetic tape, Compact Disc (CD)-ROM, digital versatile disc (DVD), Blu-ray disc etc.

A device 18*a*, 18*b*, 18*c*, 18*d*, 18*e* is provided for providing traffic related information. The device 18*a*, 18*b*, 18*c*, 18*d*, 18*e* is configured to obtain data relating to a first vehicle 21 and data relating to a second vehicle 22.

The device 18*a*, 18*b*, 18*c*, 18*d*, 18*e* is configured to establish a relative position between the first vehicle 21 and the second vehicle 22 based on the obtained data, and The device 18*a*, 18*b*, 18*c*, 18*d*, 18*e* is configured to provide, to an entity 13, 14, 19*e* in the first vehicle 21, information based on the established relative position.

The device 18*a*, 18*b*, 18*c*, 18*d*, 18*e* may be configured to perform the above steps e.g. by comprising one or more processors 40 and memory 41, the memory 41 containing instructions executable by the processor 40, whereby the device 18*a*, 18*b*, 18*c*, 18*d*, 18*e* is operative to perform the steps. In case of several processors 40 (not illustrated) they may be configured to perform all steps of the method 30 or only some of the steps.

In various embodiments, the device 18*a*, 18*b*, 18*c*, 18*d*, 18*e* is configured to obtain data relating to the first vehicle 21 by receiving or requesting the data from the first vehicle 21 via one or more of: a cellular network 2, a local area network 3, a positioning system 4, a packet data network 10 and a sensor network 24.

In various embodiments, the device 18*a*, 18*b*, 18*c*, 18*d*, 18*e* is configured to establish the relative position between the first vehicle 21 and the second vehicle 22 by calculating the relative position based on the obtained data, or by receiving, from a second device 19*a*, 19*b*, 19*c*, 19*d*, 19*e*, the relative position as calculated by the second device 19*a*, 19*b*, 19*c*, 19*d*, 19*e*.

In various embodiments, the device 18*a*, 18*b*, 18*c*, 18*d*, 18*e* is configured to provide, at least to the entity 13, 14, 19*e* in the first vehicle 21, information based on the established relative position comprises conveying the information via one or more of: a cellular network 2, a local area network 3, a positioning system 4 and a packet data network 10.

In various embodiments, the device 18*a*, 18*b*, 18*c*, 18*d*, 18*e* is configured to:

store, in a memory device 25, 45, data comprising one or more of: the data relating to the first and second vehicles 21, 22, the relative position between the first vehicle 21 and the second vehicle 22, the information based on the established relative position, data obtained from sensors 16, 15, data obtained from a positioning system 4, and to establish based on the stored data one or more of: traffic flow prediction, traffic congestion prediction, road signage issues, road quality and visibility issues.

In various embodiments, the device 18*a*, 18*b*, 18*c*, 18*d*, 18*e* is configured to:

obtain one or more of: the data relating to the first and second vehicles 21, 22, the relative position between the first vehicle 21 and the second vehicle 22, the information based on the established relative position, data obtained from sensors 16, 15, data obtained from a positioning system 4, and establish, based on one more of the obtained data, current traffic situation.

In some embodiments, the device 18*a*, 18*b*, 18*c*, 18*d*, 18*e* is configured to provide the established information at least to the first vehicle 21.

In various embodiments, the data relating to the first vehicle 21 and the data relating to the second vehicle 22 comprises one or more of: identification of the first vehicle 21, speed of the first vehicle 21, geographical position of the first vehicle 21, sensor information captured in the first vehicle 21, identification of the second vehicle 22, speed of the second vehicle 22, geographical position of the second vehicle 22, sensor information captured in the second vehicle 22.

In various embodiments, the device 18*a*, 18*b*, 18*c*, 18*d*, 18*e* is configured to provide, to a device in the second vehicle 22, information based on the established relative position.

In various embodiments, the data relating to the first vehicle 21 comprises data on distance to the second vehicle 22 as determined in the first vehicle 21 by means of a sensor 15 arranged in the first vehicle 21.

In various embodiments, the data on distance comprises distance between a first point of the first vehicle 21 and a second point of the second vehicle 22.

In various embodiments, the information based on the established relative position comprises one or more of: warning about a hazardous situation, advice on overtaking the second vehicle 22, warning about an ongoing overtaking made by the second vehicle 22.

Figure 6:
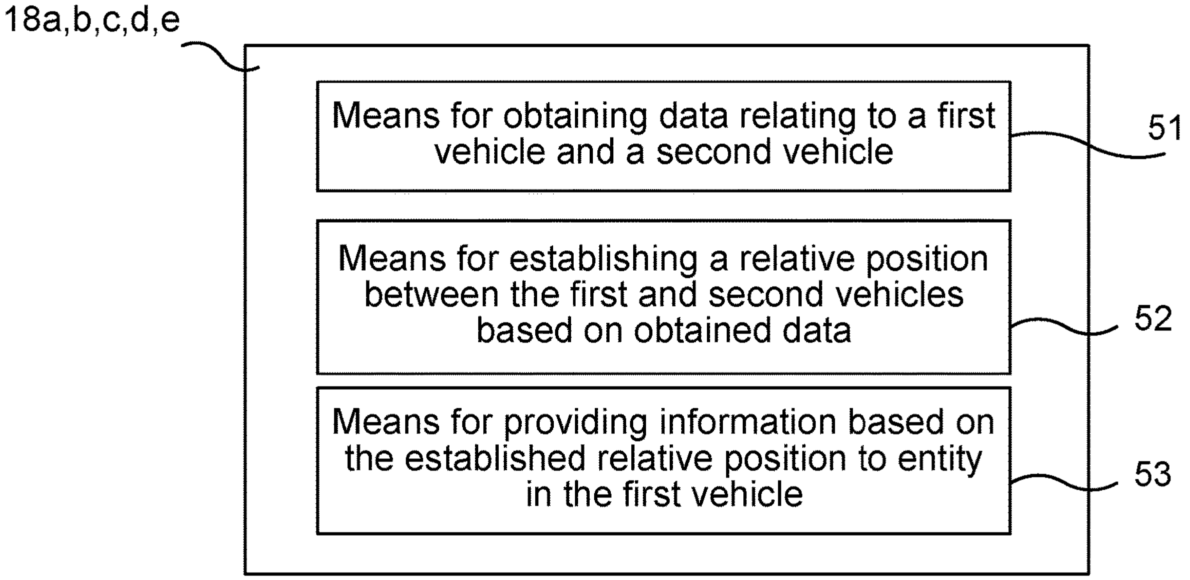
FIG. 6 illustrates a device comprising function modules/software modules for implementing embodiments in accordance with the present teachings.

FIG. 6 illustrates a device comprising function modules/software modules for implementing embodiments in accordance with the present teachings. In an aspect, means are provided, e.g. function modules or units, that can be implemented using software instructions such as computer program executing in a processor and/or using hardware, such as application specific integrated circuits, field programmable gate arrays, discrete logical components etc., or any combination thereof.

A device is provided for providing traffic related information. The device comprises first means 51 for obtaining data relating to a first vehicle and data relating to a second vehicle. Such first means 51 may for instance comprise processing circuitry for receiving and/or transmitting and/or a communication interface (e.g. units 43 and/or 44 described with reference to FIG. 5).

The device comprises second means 52 for establishing a relative position between the first vehicle and the second vehicle based on the obtained data. Such second means 52 may comprise processing circuitry adapted for such establishing, e.g. processing circuitry 44 as described in relation to FIG. 5 adapted for such establishing the relative position.

The device comprises third means 53 for providing, to an entity in the first vehicle, information based on the established relative position. Such third means 53 may for instance comprise processing circuitry for receiving and/or transmitting and/or a communication interface (e.g. units 43 and/or 44 described with reference to FIG. 5).

The device may comprise still further means for implementing the various steps and variations of the steps according to the present teachings. Such additional means may comprise processing circuitry suitably adapted and/or analog processing means and/or digital processing means or any combination thereof.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method of providing traffic related information, the method comprising:
- obtaining first vehicle data relating to a first vehicle, wherein the obtained first vehicle data comprises: i) first geographic position data indicating a location of the first vehicle and ii) first sensor data indicating that a first obstacle has been detected in the vicinity of the first vehicle, and further wherein the first sensor data comprises first directional information indicating either that i) the detected first obstacle is on the first vehicle's left or ii) the detected first obstacle is on the first vehicle's right;
- obtaining second vehicle data related to a second vehicle, wherein the obtained second vehicle data comprises second geographic position data indicating a location of the second vehicle;
- establishing a relative position between the first vehicle and the second vehicle using i) the first geographic position data indicating the location of the first vehicle, ii) the second geographic position data indicating the location of the second vehicle, and iii) the first directional information; and
- providing, to an entity in the first vehicle and/or the second vehicle, information based on the established relative position.

2. The method of claim 1, wherein
- the method is performed by a device, and
- the establishing the relative position between the first vehicle and the second vehicle comprises (i) calculating, in the device, the relative position based on the obtained first vehicle data and the obtained second vehicle data or (ii) receiving, from another device, the relative position as calculated by said another device.

3. The method of claim 1, further comprising:
- storing, in a memory device, data comprising one or more of: the obtained first vehicle data, the obtained second vehicle data, the relative position between the first vehicle and the second vehicle, the information based on the established relative position, data obtained from one or more sensors, or data obtained from a positioning system;
- establishing based on the stored data condition information that comprises one or more of: traffic flow prediction, traffic congestion prediction, road signage issues, road quality, or visibility issues; and
- providing the established condition information at least to the entity in the first vehicle.

4. The method of claim 1, further comprising:
- obtaining data from one or more sensors and/or data from a positioning system; and
- establishing current traffic situation based on one or more of the obtained first vehicle data, the obtained second vehicle data, the relative position between the first vehicle and the second vehicle, the information based on the established relative position, the data obtained from said one or more sensors, and the data obtained from the positioning system.

5. The method of claim 1, wherein each of the obtained first vehicle data and/or the obtained second vehicle data comprises one or more of: identification of the first vehicle, speed of the first vehicle, identification of the second vehicle, or speed of the second vehicle.

6. The method of claim 1, wherein the obtained second vehicle data further comprises second sensor data indicating that a second obstacle has been detected in the vicinity of the second vehicle.

7. The method of claim 6, wherein the second sensor data comprises second directional information indicating either that i) the detected second obstacle is on the second vehicle's left or ii) the detected second obstacle is on the second vehicle's right.

8. The method of claim 1, wherein the information based on the established relative position comprises one or more of: warning about a hazardous situation, advice on overtaking the second vehicle, or warning about an ongoing overtaking made by the second vehicle.

9. The method of claim 1, wherein the obtained first vehicle data comprises sensor data from at least one sensor on the first vehicle and first GPS data specifying a position of the first vehicle and further wherein the second vehicle data comprises second GPS data specifying a position of the second vehicle.

10. The method of claim 1, wherein the method is performed by a network node.

11. The method of claim 1, wherein
- the obtained first vehicle data comprises information specifying a speed of the first vehicle and sensor data specifying a distance between the first vehicle and the second vehicle; and
- the obtained second vehicle data comprises information specifying a speed of the second vehicle.

12. The method of claim 1, further comprising:
- determining whether the entity in the first vehicle is performing a first action in accordance with the provided information; and
- overtaking control of the first vehicle and performing a preventive action in accordance the provided information after determining that the entity in the first vehicle is not performing the first action in accordance with the provided information.

13. A device for providing traffic related information, the device being configured to:
- obtain first vehicle data relating to a first vehicle, wherein the obtained first vehicle data comprises: i) first geographic position data indicating a location of the first vehicle and ii) first sensor data indicating that a first obstacle has been detected in the vicinity of the first vehicle, and wherein the first sensor data comprises first directional information indicating either that i) the detected first obstacle is on the first vehicle's left or ii) the detected first obstacle is on the first vehicle's right;
- obtain second vehicle data related to a second vehicle, wherein the obtained second vehicle data comprises second geographic position data indicating a location of the second vehicle;
- establish a relative position between the first vehicle and the second vehicle using i) the first geographic position data indicating the location of the first vehicle, ii) the second geographic position data indicating the location of the second vehicle, and iii) the first directional information; and
- provide, to an entity in the first vehicle and/or an entity in the second vehicle information based on the established relative position.

14. The device of claim 13, further configured to establish the relative position between the first vehicle and the second vehicle by (i) calculating the relative position based on the obtained first vehicle data and the obtained second vehicle data or (ii) by receiving, from another device, the relative position as calculated by said another device.

15. The device of claim 13, further configured to:

store, in a memory device, data comprising one or more of: the obtained first vehicle data, the obtained second vehicle data, the relative position between the first vehicle and the second vehicle, the information based on the established relative position, data obtained from one or more sensors, or data obtained from a positioning system;

establish based on the stored data condition information that comprises one or more of: traffic flow prediction, traffic congestion prediction, road signage issues, road quality, or visibility issues; and provide the established conditional information at least to the first vehicle.

16. The device of claim 13, further configured to:

obtain data from one or more sensors and/or data from a positioning system; and establish current traffic situation based on one or more of: the obtained first vehicle data, the obtained second vehicle data, the relative position between the first vehicle and the second vehicle, the information based on the established relative position, the data obtained from said one or more sensors, or the data obtained from the positioning system.

17. The device of claim 13, wherein the obtained first vehicle data and/or the obtained second vehicle data comprises one or more of: identification of the first vehicle, speed of the first vehicle, identification of the second vehicle, or speed of the second vehicle.

18. The device of claim 13, wherein the obtained second vehicle data further comprises second sensor data indicating that a second obstacle has been detected in the vicinity of the second vehicle.

19. The device of claim 18, wherein the second sensor data comprises second directional information indicating either that i) the detected second obstacle is on the second vehicle's left or ii) the detected second obstacle is on the second vehicle's right.

20. The device of claim 13, wherein the information based on the established relative position comprises one or more of: warning about a hazardous situation, advice on overtaking the second vehicle, or warning about an ongoing overtaking made by the second vehicle.

* * * * *